Figure 1:
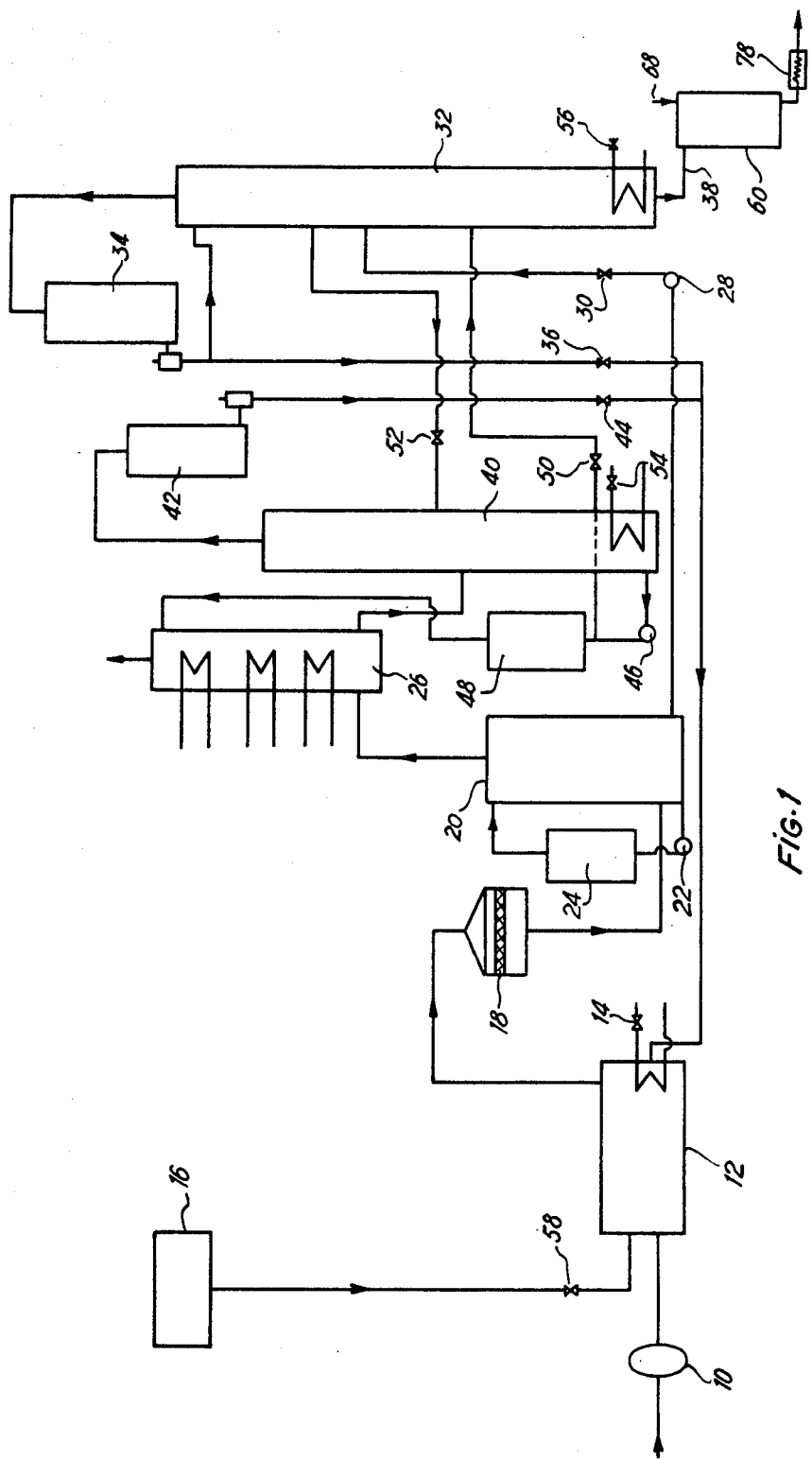

United States Patent [19]

Mir Puig

[11] 4,090,999

[45] May 23, 1978

[54] PROCESS FOR THE PRODUCTION OF UREA-FORMALDEHYDE ADHESIVES OR RESINS AND PRODUCTS OBTAINED THEREBY

[76] Inventor: Pedro Mir Puig, Paseo de San Juan 15, Barcelone, Spain

[21] Appl. No.: 682,208

[22] Filed: May 3, 1976

[30] Foreign Application Priority Data

Feb. 18, 1976 United Kingdom ............... 06356/76
Feb. 17, 1976 Germany ............................ 2606269
Feb. 16, 1976 Netherlands ........................ 7601572

[51] Int. Cl.² ..................... C08G 12/12; C07C 45/16
[52] U.S. Cl. .............................. 260/69 R; 260/67 FP; 260/603 C
[58] Field of Search ............................. 260/69 R, 603

[56] References Cited

U.S. PATENT DOCUMENTS

| 1,744,295 | 1/1930 | Ahlbeck ........................... 260/603 |
| 2,204,652 | 6/1940 | Bludworth ........................ 260/603 |
| 2,436,287 | 2/1948 | Brondyke ......................... 260/603 |
| 2,908,715 | 10/1959 | Eguchi et al. ................... 260/603 |
| 3,113,972 | 12/1963 | Kodama et al. ................. 260/603 |
| 3,277,179 | 10/1966 | Sze .................................... 260/603 |
| 3,931,063 | 1/1976 | Renner ............................. 260/69 R |

OTHER PUBLICATIONS

Miles et al., Polymer Technology (Temple, 1965), pp. 41, 53–55 [TP156P6M5].
Formaldehyde, J. F. Walker, 3rd., (Reinhold, 1968) pp. 16–24, 94–98.

Primary Examiner—Thomas De Benedictis, Sr.
Attorney, Agent, or Firm—Dressler, Goldsmith, Clement, Gordon & Shore, Ltd.

[57] ABSTRACT

This invention relates to a process in which solutions containing from 68 to 70% concentration of formaldehyde are prepared and directly reacted with urea to form urea-formaldehyde adhesives with a solids content of, for example, 65%, without any need for the adhesives or resins obtained to have to be subjected to a final distillation stage.

11 Claims, 2 Drawing Figures

PROCESS FOR THE PRODUCTION OF UREA-FORMALDEHYDE ADHESIVES OR RESINS AND PRODUCTS OBTAINED THEREBY

The present invention relates to a process for the production of urea-formaldehyde adhesives or resins, and to the products obtained by this process. More specifically, the invention relates to a process for producing urea-formaldehyde adhesives or resins from methanol by preparing a concentrated aqueous solution of formaldehyde and reacting it with urea. The invention also relates to the preparation of concentrated aqueous solutions of formaldehyde which may be run off from the installation for other applications, such as the production of paraformaldehyde.

There are already known various processes for preparing formaldehyde from methanol, generally in the gas phase and at elevated temperature, which comprise passing a mixture of methanol vapour and air in suitable proportions over a catalyst.

In one of these known processes, the oxidation products obtained are condensed in order to obtain, on the one hand, the condensable products and, on the other hand, the uncondensed gases. These uncondensed gases are washed with water to form a formaldehyde solution and to recover the unreacted methanol. The solution thus obtained is combined with the condensed products and forms the crude aqueous formaldehyde solution. The formaldehyde concentration of this solution is dependent upon the quantity of water used for washing the gases.

In addition to formaldehyde, the crude solution obtained contains methanol in a variable quantity according both to the type of catalyst used and to the proportions of air and methanol used. This solution may be directly used or may be partly or completely freed from the methanol present in it.

Although this process is generally satisfactory, it is nevertheless attended by the disadvantage that the concentration of the aqueous formaldehyde solutions obtained is necessarily limited on account of the fact that the uncondensed gases have been washed with a quantity of water sufficient to remove the formaldehyde and methanol present in these gases and which would otherwise be lost from the system.

The aqueous formaldehyde solutions thus obtained, of which the concentration amounts to between 30% and 50%, may then be processed into dilute solutions of urea-formaldehyde adhesive which have to be concentrated by distillation in vacuo to form standard commercial-grade adhesives, i.e., adhesives with a solids content of 65%.

This final distillation stage is attended by the following disadvantages:

a. it is necessary to use an apparatus operating in vacuo, which is always expensive, both in the case of continuous operation and in the case of batch operation;

b. the resin obtained has to be heated, which gives rise to local increases in temperature on the walls of the apparatus, resulting in secondary reactions which adversely affect the quality of the resin;

c. it is also difficult to control the quality of the resin produced on account of changes in viscosity which take place during distillation, in addition to which the heating surfaces become encrusted as a result of polymerization of the resins; and d. the distillate, which always has to be removed, contains relatively large quantities of formaldehyde, which gives rise to a problem of pollution.

The present invention obviates these disadvantages by providing a process in which solutions containing from 68 to 70% concentration of formaldehyde are prepared and directly reacted with urea to form urea-formaldehyde adhesives with a solids content of, for example, 65%, without any need for the adhesives or resins obtained to have to be subjected to a final distillation stage.

The process for producing urea-formaldehyde adhesives or resins according to the invention comprises the stages of:

a. catalytically oxidizing methanol with air;

b. condensing the gases emanating from the catalytic oxidation of stage (a) whereby condensable products therein are condensed in the form of a solution;

c. separating the solution containing the condensed products obtained in stage (b) from the uncondensed gases remaining after said condensation stage;

d. cooling the uncondensed gases from stage (c) and washing the cooled gases in a washing column with a solution of cold polymerised formaldehyde which takes up the methanol and formaldehyde present in the uncondensed gases;

e. distilling the solution obtained in stage (c) in order to recover separately a concentrated aqueous formaldehyde solution and methanol;

f. distilling the solution obtained in stage (d) in order to recover the methanol taken up into said solution and to isolate the formaldehyde in the form of a solution thereof;

g. combining a part of the formaldehyde solution obtained in stage (f) with the condensed, distilled formaldehyde solution obtained in stage (e); and h. mixing the concentrated aqueous solution of formaldehyde obtained in stage (e) with urea under conditions of predetemined pH and temperature in order to obtain urea-formaldehyde adhesives or resins.

If desired, all or part of the concentrated aqueous solution of formaldehyde may be run off after stage (e) for other applications, for example for forming paraformaldehyde.

According to another aspect of the invention, the gases are condensed in stage (b) by washing in a washer with the condensed products circulated by means of a pump from the base of the washer and cooled by means of a coolant outside the washer.

According to yet another aspect of the invention, the formaldehyde washing solution used for stage (d) is obtained by running off a formaldehyde solution from the sump of the washing column, heating the solution, partly distilling it to recover the methanol present and to isolate and formaldehyde, and after cooling removing a certain amount of the solution, which amount is added to the condensed products emanating from stage (c).

Accordingly, it is possible by virtue of the process according to the invention directly to obtain urea-formaldehyde adhesives or resins without any need to carry out a final distillation stage, because it uses aqueous formaldehyde solutions of high concentration by virtue of the fact that said solutions only contain the water produced during catalytic oxidation of the methanol. This process also has the advantage of enabling all the methanol present in the uncondensed gases to be recovered, because the quantity of washing agent is limited solely by the increase in the consumption of heat resulting from the exhaustion of the methanol content of the washing solution.

The washing column using polymerised formaldehyde has to operate at low temperature, and certain plates of the column may be cooled by means of liquid coolants or methanol cooled by air in a first washer before catalysis.

Distillation of the formaldehyde solution to recover the methanol may be carried out in the usual way, i.e., in suitable columns, under atmospheric pressure or under a pressure below atmospheric pressure. However, in view of the fact that complete elimination of the formaldehyde present in the concentrated formaldehyde solution may require high temperatures, it is possible directly to use the heat of the gases given off during catalysis at 500° C, providing a heat exchanger is present.

In stage (h) of the process, the hot formaldehyde solution is mixed with urea at a pH-value of from 7.5 to 8.5, followed by the addition of an acid product to keep the pH between 5 and 6.5 if it is desired to obtain solutions of urea-formaldehyde adhesive which are subsequently to be stored after cooling. If, attentatively, a pH of the order of 8 to 9 is maintained throughout stage (h) and if the urea is used in a smaller proportion than the formaldehyde, highly stable, concentrated urea-formaldehyde solutions are obtained and may be marketed in particular as a basic material for the production of solid resins, moulding powders or adhesives.

The process according to the invention has in particular the following advantages.

Firstly there is no need to concentrate the resin obtained, which makes it unnecessary to work in vacuo and to use an expensive apparatus both in the case of continuous operation and in the case of batch operation.

Secondly, the resin obtained does not have to be heated, thereby avoiding local increases in temperature on the walls of the apparatus that are the cause of secondary reactions which can have an adverse effect upon the quality of the resin, and also thereby avoiding the production of any deposits on the walls of the apparatus.

Thirdly it is possible more effectively to control the different qualities of resin produced by virtue of the fact that, once the reaction is over, the resin is formed and only has to be cooled. Accordingly, there is no change in viscosity nor any other modification due to subsequent concentration;

Fourthly, it is possible to work in batches of 32 tonnes, and finally problems of pollution are completely eliminated because no effluents are formed, even during cleaning, by virtue of the fact that there is never any formation of crusts which have to be removed. In addition, there is no atmospheric pollution because the gases left after the production of formaldehyde are burnt off in a boiler.

It should be noted that the process can be carried out continuously, but also it affords the particular advantage of being able to produce individual batches of adhesives or resins. This is important because, in order to satisfy demand, it is often required to produce adhesives of different quality and this involves making particular adjustments for each of the different adhesives required. To have to make adjustments of this nature is a disadvantage in a method of continuous operation, and it is thus preferred to work in batches using separate tanks where the particular adjustments can be made.

According to the invention, it is possible effectively to work in tanks of this kind which may be simple and lightweight. This would not have been possible with conventional processes which necessitated a final distillation stage, which the associated equipment.

An exemplary embodiment of the invention is described in detail in the following, with reference to the accompanying drawings, wherein:

FIG. 1 diagrammatically illustrates an apparatus for the production of urea-formaldehyde adhesives or resins.

Figure 2:
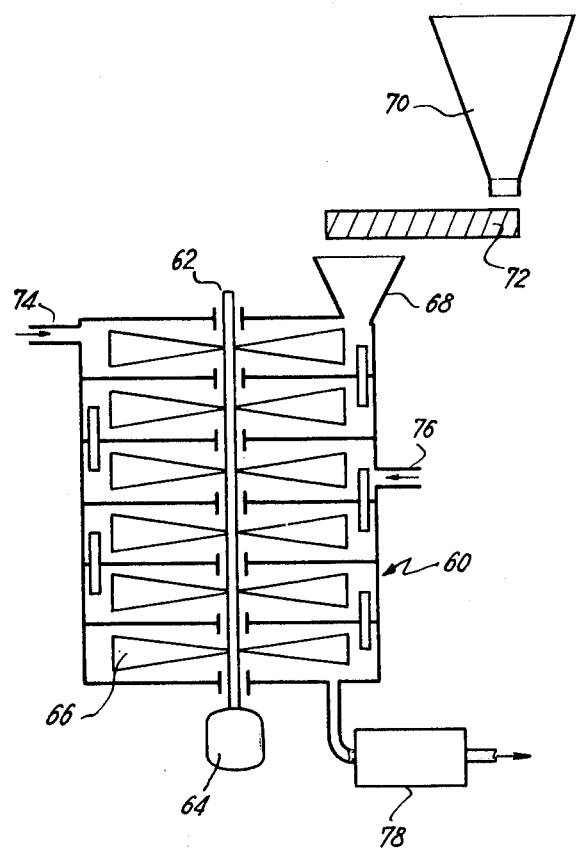

FIG. 2 diagrammatically illustrates one embodiment of an apparatus for the continuous production of urea-formaldehyde adhesives from concentrated solutions of formaldehyde.

Using the apparatus illustrated in FIG. 1, 2000 kg/hour of atmospheric air at a pressure of 760 mm of mercury are drawn in by means of a gas blower 10 and introduced into a saturator 12 where they bubble through methanol kept at 50.5° C by means of a steam heating unit regulated by a valve 14. The saturator 12 is fed with methanol from a reservoir 16 of which the constant output is regulated by means of a valve 58 fitted in the pipe connecting the reservoir 16 to the saturator 12.

The mixture issuing from the saturator 12, containing 1950 kg/h of methanol, is then passed over a catalyst 18 based on metallic silver kept at a temperature of the order of 500° C in order to convert 1160 kg/hour of methanol into formaldehyde by the conventional reaction with corresponding liberation of hydrogen, of which part is oxidised into water by the oxygen present in the air. A small quantity of carbon dioxide is formed at the same time and virtually all the oxygen present in the air is transformed during the reaction.

The gaseous mixture emanating from the catalyser then enters the base of a washer 20 which at its head receives the condensation products removed from the base of the washer circulated by means of a pump 22 and cooled by a cooler 24.

The mixture thus collected is delivered by means of a pump 28 and under the control of a valve 30 to a distillation column 32 which removes the methanol present in the mixture it receives. After condensation in a condenser 34, this methanol is returned to the saturator 12 under the control of a valve 36. The aqueous formaldehyde solution remaining in the column 32 has a concentration of 65% and is substantially free from methanol. This solution is removed at the sump of the distillation column 32 and is introduced into a reactor 60, in which reaction of the formaldehyde with urea is effected.

The gases issuing from the washer 20 are introduced into a washing column 26 which at its head receives 50% formaldehyde in polymerised and hydrated form derived from column 40 (infra). A liquid mixture of the following constituents is collected at the base of the washer 26:

total formaldehyde: 1410 kg
water: 1400 kg
methanol: 130 kg
total condensates: 2940 kg.

The liquid emanating from the second wash of the gases in the column 26 is introduced into a column 40 to remove the methanol and to fix the formaldehyde. The methanol is collected in a condenser 42 and delivered from there to the saturator 12 under the control of a valve 44.

The liquid emanating from the sump of the column 40 is recycled by means of a pump 46 to the head of the washing column 26 after having been cooled by a cooler 48.

In order to keep constant the quantity of liquid circulating between the column 26 and the column 40, the excess of this liquid is removed at the output end of the pump 46 by a valve 50 and is added to the concentrated formaldehyde in the distillation column 32. On the other hand, 100 kg/hour of concentrated, partially polymerised formaldehyde are removed from the column 32 and delivered to the column 40 under the control of a valve 52.

The distillation column 40 is heated by means of a steam coil regulated by a valve 54, whilst the distillation column 32 is heated by means of a steam coil regulated by a valve 56.

Various modifications of detail may be made to the process for producing concentrated aqueous formaldehyde solutions described above without departing from the scope of the invention.

For example, it is possible, in order to accelerate polymerisation of the formaldehyde used for washing, to add to it traces of a suitable product such as, for example, traces of an acid or alkali.

It is also possible to leave out the distillation column 40 by increasing the diameter of the column 32 and carrying out the two corresponding distillation operations in this single column.

By way of modification, it is possible to run off part of the formaldehyde from the last two plates at the base of the column 32 so as to obtain for example 50% formaldehyde on the one hand and 85% formaldehyde on the other hand.

The 1420 kg of 68% formaldehyde obtained are introduced into the reactor 60 with urea in a variable quantity according to the quality of the adhesive which it is desired to obtain. For example, 2620 kg of adhesive are obtained with 1200 kg of urea.

The concentrated formaldehyde may be run off at 38 for other applications, for example for the production of paraformaldehyde.

Turning now to FIG. 2, the apparatus illustrated diagrammatically therein is used for 68% formaldehyde solutions obtained in the manner described above. This apparatus comprises a plate column 60 provided with a stirrer 62 rotated by a motor 64 and comprising a plurality of blades, such as 66, designed to stir the reaction mixture at the level of each plate.

Urea is introduced through an inlet 68 formed in the upper part of the column from a reservoir 70 with continuous feed by an endless screw 72.

The hot 68% formaldehyde is introduced through a lateral inlet 74 into the upper part of the column in a regulated quantity.

The pH of the mixture is controlled in the upper part of the column, being kept between pH 7.5 and pH 8.5, according to the quality of the adhesive to be obtained. A product which is sufficiently acid to keep the pH value between 5 and 6.5 is introduced through a pipe 76 towards the middle of the column. Formic acid is generally used for this purpose. The hot urea-formaldehyde adhesive is collected at the base of the column and is stored after cooling by means of a coolant 78.

The column 60 is equipped with means for controlling pH, temperature and viscosity in certain plates, adjustments being made according to the quality of adhesive to be obtained.

To this end, certain parts of the column are heated or cooled individually and separately by means of suitable devices.

Instead of working continuously with the apparatus shown in FIG. 2, it is possible to work in batches in tanks with a capacity of for example 30 cubic meters.

Naturally the invention is by no means limited to the embodiment described above and modifications of detail may be made without departing from the scope of the invention.

What I claim is:

1. In a process for the production of a urea-formaldehyde reaction product of the class consisting of urea-formaldehyde adhesives and urea-formaldehyde resins wherein
    a. methanol is catalytically oxidized with air to produce a partially condensible gaseous product containing formaldehyde and (h) formaldehyde from said methanol oxidation is reacted with urea under conditions of suitable pH and temperature to produce said urea-formaldehyde product, the improvement comprising the steps of:
    b. condensing said partially condensible gaseous product emanating from said catalytic oxidation of methanol whereby condensible components therein are condensed in the form of a solution;
    c. separating the solution containing condensed components in step (b) from the uncondensed gases remaining after said condensation step;
    d. cooling the uncondensed gases from step (c) and washing the cooled gas in a washing column with a solution comprising cold polymerized formaldehyde which takes up the methanol and formaldehyde present in the uncondensed gas;
    e. distilling the solution obtained in step (c) in order to recover separately methanol and a concentrated aqueous formaldehyde solution, the formaldehyde content of which is at least partially in polymerized form;
    f. distilling the solution obtained in step (d) in order to recover the methanol taken up into said solution and to isolate the formaldehyde in the form of an aqueous solution thereof containing polymerized formaldehyde;
    g. passing a portion of the aqueous formaldehyde solution obtained in step (f) to distillation step (e) and recycling another portion of the aqueous formaldehyde solution obtained in step (f) to step (d) as the cold polymerized washing solution therein; and
    utilizing in step (h) for reaction with urea the aqueous formaldehyde solution containing formaldehyde polymer obtained in step (e).

2. A process as claimed in claim 1, wherein in stage (b) the gases are condensed by washing in a washer with the condensed products circulated by means of a pump from the base of the washer, said condensed products being cooled by means of a cooler outside the washer.

3. A process as claimed in claim 1, wherein the formaldehyde washing solution used in stage (d) is obtained by running off a formaldehyde solution from the sump of the washing column, heating it, partly distilling the solution to recover the methanol present in it and to isolate the formaldehyde and, after cooling, removing a part of the solution which part is added to the condensed products emanating from stage (c), the remainder of said solution being used as the washing solution in stage (d).

4. A process as claimed in claim 1, wherein the methanol recovered in stages (e) and (f) is returned to stage (a).

5. A process as claimed in claim 1 wherein distillation in stage (e) and distillation in stage (f) are carried out in two separate columns.

6. A process as claimed in claim 1, wherein distillation in stage (e) and distillation in stage (f) are carried out in a single column.

7. A process as claimed in claim 1, wherein in stage (h) the hot formaldehyde solution is mixed with urea at a pH maintained between 7.5 and 8.5, followed by the addition of an acid product to keep the pH between 5 and 6.5 if it is desired to obtain solutions of urea-formaldehyde adhesive which are subsequently to be stored after cooling.

8. A process as claimed in claim 1, wherein in stage (h) the hot formaldehyde solution is mixed with a smaller proportion of urea at a pH maintained between 8 and 9.

9. Urea-formaldehyde adhesives obtained by the process as claimed in claim 7.

10. Urea-formaldehyde concentrates obtained by the process as claimed in claim 8.

11. Concentrated aqueous formaldehyde solutions obtained in stage (e) of the process as claimed in claim 1.

* * * * *